United States Patent [19]

Sons, Jr.

[11] 4,150,703
[45] Apr. 24, 1979

[54] BELT SEPARATION-RESISTANT TIRE CONFIGURATION

[75] Inventor: Charles C. Sons, Jr., Peoria, Ill.

[73] Assignee: Caterpillar Tractor Co., Peoria, Ill.

[21] Appl. No.: 894,815

[22] Filed: Apr. 10, 1978

Related U.S. Application Data

[63] Continuation of Ser. No. 734,684, Oct. 22, 1976, abandoned.

[51] Int. Cl.$^2$ ............................................. B60C 9/20
[52] U.S. Cl. ............................ 152/361 R; 152/354 R
[58] Field of Search ............... 152/354 R, 355, 356 R, 152/361 R, 361 FP, 361 DM

[56] References Cited

U.S. PATENT DOCUMENTS

| | | | |
|---|---|---|---|
| 2,976,905 | 3/1961 | Beckadolph | 152/354 R |
| 3,431,963 | 3/1969 | Sons, Jr. | 152/356 R |
| 3,623,528 | 11/1971 | Kovac et al. | 152/361 DM |
| 3,643,723 | 2/1972 | Mukai et al. | 152/361 DM |
| 3,730,246 | 5/1973 | Sidles et al. | 152/356 R |

FOREIGN PATENT DOCUMENTS 2532764  7/1975  Fed. Rep. of Germany ...... 152/354 R

*Primary Examiner*—Francis S. Husar
*Assistant Examiner*—Randolph A. Reese
*Attorney, Agent, or Firm*—Phillips, Moore, Weissenberger, Lempio & Majestic

[57] ABSTRACT

A pneumatic tire has one or more radial plies formed of cords of reinforcing material which extend continuously between the two bead regions of the tire within the side walls and tread region. Belts of reinforcing material extend circumferentially within the tread region with a plurality of the belts being situated inside the portion of the radial ply which is within the tread region. Successively more inward ones of the belts are of progressively greater width enabling the lateral edges of each belt to be situated adjacent the inside surface of the radial ply and relatively remote from the edges of adjacent belts. With the edges of the belts thus located, the stress riser effect is reduced and there is less tendency for the belt edges to peel away from the radial ply when the tire is subjected to cornering forces. Belt separation is thereby inhibited and the reliability and durability of belted radial-ply tires is enhanced.

2 Claims, 4 Drawing Figures

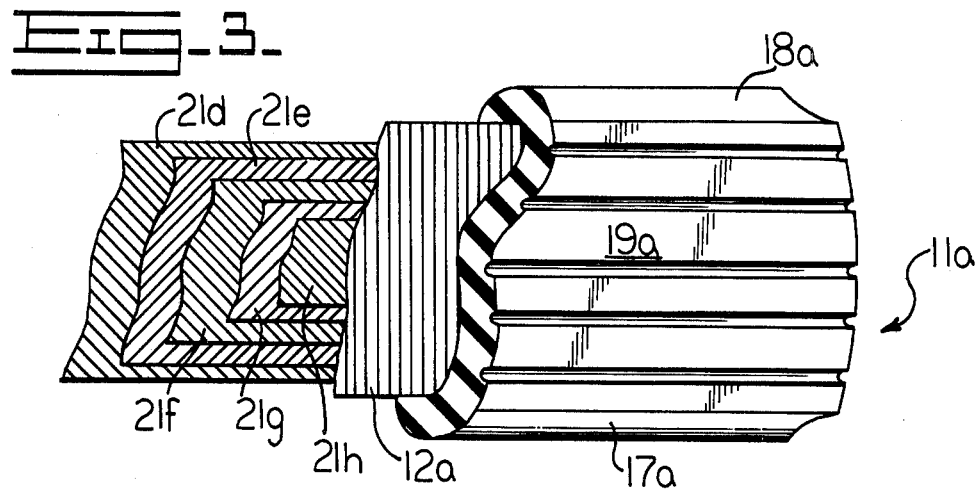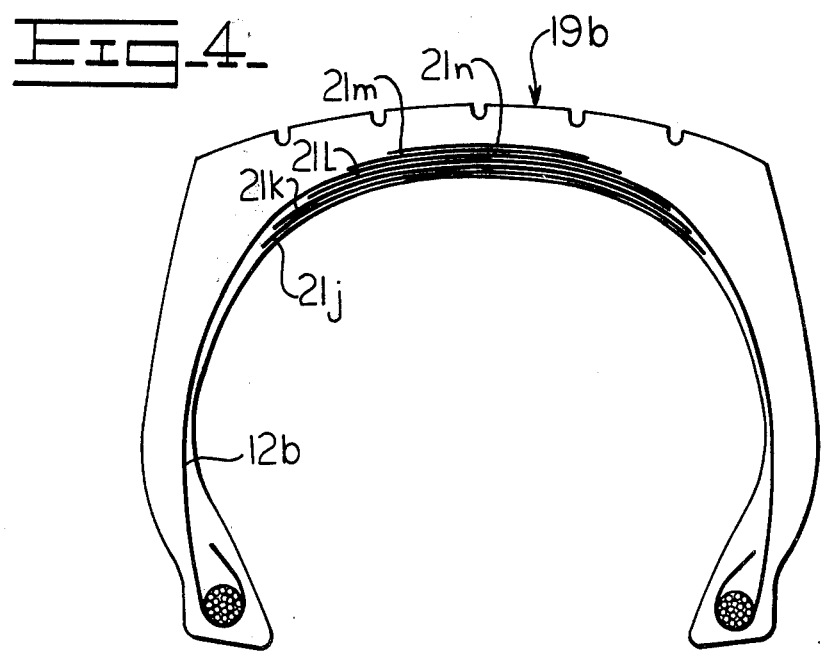

BELT SEPARATION-RESISTANT TIRE CONFIGURATION

This is a continuation of Ser. No. 734,684, filed Oct. 22, 1976 now abandoned.

BACKGROUND OF THE INVENTION

This invention relates to tires and tire castings for vehicles and more particularly to tires of the type having one or more radial plies or the like together with circumferential belt reinforcements.

Vehicles tires having radial-ply reinforcements extending between the bead regions within the tire together with belts extending circumferentially within the tread region have recently come into widespread use. Both the radial plies and circumferential belts are typically formed of layers of cords of high tensile strength material such as steel cables, for example, with the cords being embedded in an elastomeric material to form the plies and belts. Relative to older forms of tire, the belted radial-ply configuration provides a highly reliable and durable tire and one which is more resistent to various forms of unwanted deformation during use. Reinforcements of this particular kind also serve to reduce the rate of tread wear and to protect against punctures and other problems encountered in tires.

Belted radial-ply tires as heretobefore constructed are subjected to another problem which to some extent detracts from the basic advantages discussed above. In particular, there is a tendency for a phenomenon known as belt separation to occur. The stresses and distortions to which a tire is subjected in use tend to break the bond between circumferential belts and the surrounding elastomeric tire material. While this can occur at any region on the belts it tends to be particularly pronounced along the edges of the belt.

Belt separation can be initiated by fatigue as well as high stressing and is accelerated by operating the tire at high internal temperature levels. The edges of the belts are particularly vulnerable to these types of failure due to the stress riser effect where the high-strength belt material terminates.

As heretofore constructed, the circumferential belt reinforcements have usually been situated radially outwardly from the radial ply or plies. Such an arrangement has certain advantages such as the fact that circumferential belts in this location serve to some extent to protect the underlying radial plies which are the primary reinforcement of the tire carcass. However, in such an arrangement there is nothing to resist belt separation other than the strength of the bond between the belts and the surrounding rubber or other elastomeric material.

There have been some tire configurations proposed for tires having a plurality of radial plies in which some of the circumferential belts have been situated radially inward from at least some of the radial plies. A belt which is situated radially inwardly from a radial ply may be to some extent more resistant against belt separation owing to the effect of the radial ply in resisting stresses and distortions of the kind which tend to aggravate the problem. As heretobefore constructed, these tire configurations have not realized the full potential of such a disposition of circumferential belts relative to radial plies. Belt separation has continued to be one of the more serious problems encountered in the use of this otherwise highly advantageous type of tire.

SUMMARY OF THE INVENTION

This invention provides a belted radial-ply tire or the like which is extremely resistant to belt separation and is therefore highly reliable and durable.

In a preferred form of the invention, one or more radial plies extend continuously between the two bead regions of the tire through the side walls and tread region and a plurality of circumferential belt reinforcements are situated radially inward from a radial ply which is preferably the innermost of the radial plies in the case of a tire having more than one radial ply. The plurality of circumferential belts are of progressively greater width towards the center of the tire so that both edges of each of the plurality of belts may be located adjacent the inner surface of a radial ply. Thus the radial ply acts to restrain the edges of each of the belts against the kind of movement relative to the surrounding material which otherwise promotes belt separation. The configuration is fully compatible with the use of still additional belts disposed outwardly of the radial ply in the conventional manner to protect the ply against puncture injury.

While this advantageous configuration and disposition of reinforcement belts is compatible with tires of the form having a plurality of radial plies, it is particularly advantageous in single radial-ply tires as a high degree of resistance to failure from various forms of tire distortion is present without requiring a complex and costly multiple radial-ply construction for such purposes.

Accordingly it is an object of this invention to provide a more reliable and durable tire configuration.

It is another object of this invention to alleviate the problem of belt separation in tires of the form having one or more radial plies or other transverse reinforcement members and also having a plurality of circumferential belts.

It is another object of the invention to provide for greater restraint of circumferential belts against unwanted movement relative to the adjacent tire material.

It is still another object of this invention to reduce the stress riser effect at the edges of circumferential reinforcement belts in a tire.

The invention, together with other objects and advantages thereof, will best be understood by reference to the following description of preferred embodiments taken in conjunction with the accompanying drawings.

BRIEF DESCRIPTION OF THE DRAWINGS

In the accompanying drawings:

FIG. 3 is a plan view of portion of the tire of FIG. 2 further illustrating the arrangement of radial ply and reinforcing belts therein, and FIG. 4 is a cross-sectional view through a tire embodying a modification of the present invention.

DESCRIPTION OF THE PREFERRED EMBODIMENTS

Figure 1:
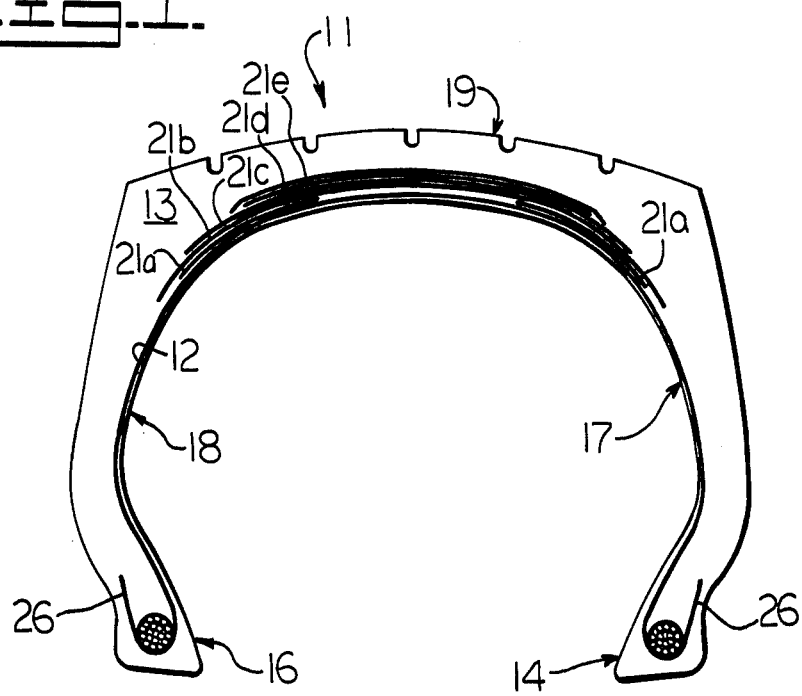
FIG. 1 is a cross-section view through a belted radial-ply tire of known form and illustrate one prior art disposition of circumferential belts relative to a radial ply.

Referring now to the drawings and initially to FIG. 1 thereof, the known construction for a belted radial-ply tire 11 includes one or more radial plies 12 extending from side to side within the tire carcass 13. Each such radial ply 12 may typically be formed of a layer of cords or wires of high tensile strength material such as steel cable and which extend from one bead region 14 of the tire to the other bead region 16 of the tire through the side wall regions 17 and 18 and through the tread region 19.

As is known in the art, the presence of one or more radial plies 12 or other transversely extending reinforcement elements greatly increases the ability of the tire to resist unwanted forms of distortion with the ultimate result of providing a tire of greater reliability and durability. It is also recognized that tire performance can be still further improved in these respects by also including one or more annular belts 21 of which five such belts 21a to 21e are shown in the example depicted in FIG. 1. Belts 21 may also be formed of layers of reinforcing wires of steel or other high-strength cords or cables embedded in an elastomeric material and extend in a circumferential direction within the tread region 19 of the tire. The belts 21 are of progressively greater diameter and of varying lateral width from the radially innermost belt 21a to the radially outermost belt 21c.

The belts 21 perform several highly important functions in a radial-ply tire including resisting modes of unwanted tire distortion which are not overcome by the radial plies 12. For example the circumferential belts greatly increase the ability of the tire to resist the phenomenon known in the art as squirming, which otherwise accelerates wear and deterioration of the tire.

It has also been found that circumferential reinforcing belts 21 resist penetration of the tire by sharp objects and thereby aid in preventing punctures and also serve to some extent to protect the radial ply 12 which is the primary structural reinforcing member of the tire. Perhaps for this reason it has been the common practice to situate the belts 21 radially outward, with respect to the geometrical center of the tire, from the radial ply 12.

The basic advantages of the belted radial-ply configuration have not always been fully realized because of a tendency for a phenomenon called belt separation to occur. The stresses and deformations and consequent fatigue effects which occur in operation tend to break the bond between successive ones of the belts 21 between the belts and the surrounding elastomeric material of the tire carcass and between the innermost belts 21a and the radial ply 12. While belt separation can occur at any region of the belt, it is particularly prone to occur along the lateral edges of the belts. Belt separation effects detract from the ability of the belted radial-ply configuration to achieve the desired objectives as discussed above and create zones of weakness which can contribute to tire failure.

Figure 2:
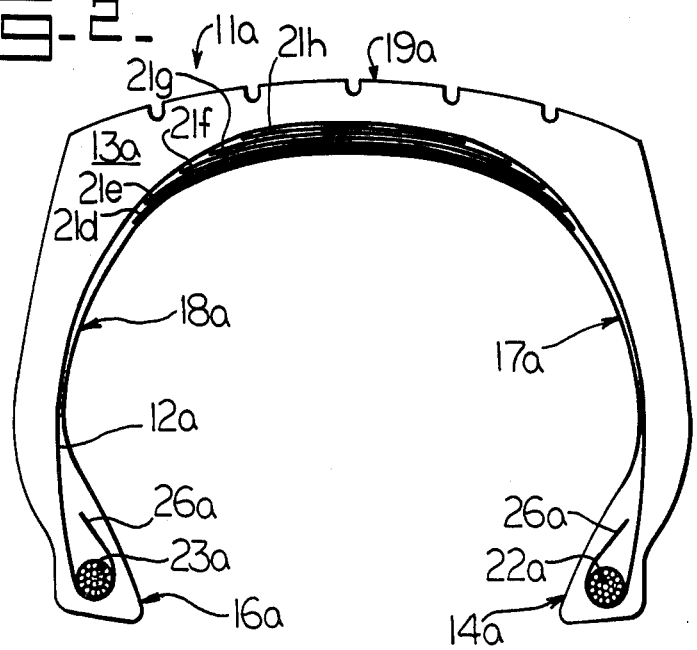
FIG. 2 is an analogous cross-sectional view through a belted radial-ply tire embodying the present invention.

Considering now a first example of the present invention with reference to FIGS. 2 and 3 in conjunction, a tire 11a may include a carcass 13a with bead regions 14a and 16a, tread region 19a and side wall regions 17a and 18a.

A single radial ply 12a again extends within the tire carcass from bead region 14a to bead region 16a and a plurality of circumferentially extending reinforcing belts, of which there are five 21d to 21h in this particular example, are again provided within the tread region 19a of the tire, the belts being disposed in coaxial relationship to the axis of rotation of the tire.

While the radial ply of a single-ply tire, or the innermost radial ply of one having a plurality of such plies, has heretofore customarily been situated close to the inner surface of the tire carcass as depicted in FIG. 1, the radial ply of the present invention as shown in FIG. 2 departs from this placement at certain points within the tire carcass. In particular, as the radial ply 12a approaches the tread region 19a from the side wall region 17a it becomes progressively more distant from the inner surface of the tire carcass and then as it approaches the other side wall region 18a it is again arranged to become closer to the inner surface of the carcass.

This disposition of the radial ply 12 of the inner-most radial ply in the case of one having a plurality of radial plies enables the reinforcing belts 21d to 21h to be situated inboard or closer to the geometrical center of the tire than the portion of the radial ply which extends across the tread region 19a. This disposition of the radial ply 12 outwardly from the reinforcement belts 21d to 21h enables the radial ply to be utilized to restrain relative movement between the several belts and outward movement of the belts relative to adjacent elastomeric material of the tire carcass 13a, thereby inhibiting the development of belt separations.

This inhibition of belt separations is enhanced if the reinforcement belts which are of progressively greater diameter from the innermost belt 21d to the outermost belt 21h are also made to be of progressively less lateral width from the innermost belt to the outermost belt so that the lateral edges of each of the belts may be adjacent the inside surface of the radial ply 12a. With this arrangement, the lateral edges of each belt, which constitute the zones where belt separation is most likely to occur, are more directly and positively restrained against radially outward movement of the kind which tends to create belt separations. Belt separation at other areas is also effectively restrained and stress riser effects around the lateral edges of the belts are greatly diminished.

The restraining of the belts 21 against separation as described above promotes longer tire life and to gain the full benefit of this result, other portions of the tire should also be designed for functional longevity. One means of accomplishing this is to form the radial ply 12a with the end configuration disclosed in my prior U.S. Pat. No. 3,431,963. As discussed in that prior patent, the ends 26 of the radial ply 12a preferably do not follow closely along the inner surface of the tire carcass 13a as the bead regions 14a and 16a are approached and then turn outwardly around the bead reinforcement members 22a and 23a to terminate near the outer wall of the tire carcass as depicted in FIG. 1 and as has been the older practice in the prior art. Instead, in keeping with these teachings of my prior U.S. Pat. No. 3,431,963, failure rate in the side wall regions of the present tire is reduced by adopting the radial ply end configuration illustrated in FIG. 2. In particular, as the ends 26a of the radial ply 12a approach the bead regions 14a and 16a, the ply increasingly departs from the inner surface of the tire carcass and approaches the outer surface with the ends 26a of the ply then being turned inwardly around the bead reinforcement members 22a and 23a and being terminated near the inner surface of the tire carcass. This situates the sharp ends of the radial ply wires in a region which is subject to less tensioning stress than is the case in the more conventional configuration and also reduces or eliminates reversal or curvature in the radial ply as the bead regions are approached which curvature can contribute to failure when the tire is cycled in operation.

It is not essential in all cases that all of the reinforcing belts 21 be situated inside the portion of the radial ply which crosses the tread region. While belts disposed in this manner are strongly protected against separation, such belts do not provide the further advantage of protecting the primary reinforcement members, the radial ply, against injury by sharp objects penetrating into the tire carcass. Protection of this kind can be provided by a modification of the tire configuration of the form depicted in FIG. 4.

In particular, the tire configuration of FIG. 4 also uses a plurality of reinforcing belts of which five belts 21j to 21n are employed in this example but only three of these belts, 21j, 21k and 21l, are situated inboard of the radial ply 12b while the remaining two belts 21m and 21n are disposed radially outward from the portion of the ply which extends within the tread region 19b. Thus in this configuration as shown in FIG. 4, which in many instances is the preferred tire construction, one portion of the reinforcing belts is strongly protected against separation while the other portion of the reinforcing belts, although lacking such protection, contribute the further useful result of protecting the radial ply 12b against penetration injury. The tire construction of FIG. 4 may otherwise be similar to that described with reference to FIG. 2.

While the invention has been described for purposes of example primarily with reference to radial-ply tires of the form in which the component cords or wires of the primary structural reinforcement extend within planes containing the rotational axis of the tire, the invention is also applicable to bias belted tires in which the corresponding reinforcement wires lie in planes forming an angle with the axis of tire rotation.

Thus while the invention has been described with respect to certain specific examples, it will be apparent that many modifications and variations are possible and it is not intended to limit the invention except as defined in the following claims.

What is claimed is:

1. A pneumatic tire of the form having an annular tread region and a pair of annular bead regions of lesser diameter and a pair of side wall regions each extending from a separate one of said bead regions to a separate side of said tread region, further comprising:

a single transverse primary reinforcement ply formed of cords of reinforcing material extending continuously from one of said bead regions to the other thereof within said side wall regions and within said tread region, said primary reinforcement ply being located further from the inner surface of said tire in said tread region than in said sidewall regions at least one outer belt of reinforcing material extending circumferentially within said tread region of said tire and being situated radially outward from the portion of said primary reinforcement ply which extends across said tread region, and a plurality of inner belts of reinforcing material extending in a circumferential direction within said tread region of said tire, said plurality of inner belts being of progressively smaller diameter from the outermost of said plurality of inner belts to the innermost thereof, and being situated radially inwardly from the portion of said primary reinforcement ply which extends across said tread region, said plurality of inner belts being of progressively greater width from the outermost to the innermost thereof and wherein the lateral edges of each of said plurality of inner belts are adjacent the inner surface of said primary reinforcement ply and equidistant from said cords thereof.

2. The combination of claim 1 wherein a separate one of a pair of annular bead reinforcement elements extends within each of said bead regions of said tire, and wherein said primary reinforcement ply is a radial ply having end portions which are doubled back around said bead reinforcement elements and which terminate in said side wall regions with said end portions of said radial ply being closer to the inner surfaces of said side wall regions than are the adjoining portions of said radial ply.

* * * * *